(12) United States Patent
Katayama et al.

(10) Patent No.: US 6,481,464 B1
(45) Date of Patent: Nov. 19, 2002

(54) CHECK VALVE

(75) Inventors: Kazutaka Katayama, Komaki (JP);
Koji Senda, Niwa-gun (JP); Hiroyoshi Mori, Iwakura (JP); Chiaki Yuzuriha, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/107,452

(22) Filed: Mar. 28, 2002

(30) Foreign Application Priority Data

Mar. 30, 2001 (JP) .......................................... 2001-100551

(51) Int. Cl.$^7$ ................................................ F16K 15/14
(52) U.S. Cl. ........................ 137/843; 137/511; 137/846; 251/368; 524/588; 528/24; 528/32; 528/42
(58) Field of Search ................... 137/511, 843, 137/846; 251/368; 524/588; 528/24, 32, 42

(56) References Cited

U.S. PATENT DOCUMENTS

| | | | | |
|---|---|---|---|---|
| 3,236,496 A | * | 2/1966 | Rosenstein et al. | 137/434 |
| 4,196,886 A | * | 4/1980 | Murray | 251/357 |
| 4,197,382 A | * | 4/1980 | Fukushima et al. | 525/403 |
| 4,492,786 A | * | 1/1985 | Evans et al. | 524/588 |
| 4,525,528 A | | 6/1985 | Bush et al. | 524/860 |
| 4,657,965 A | * | 4/1987 | Watanabe et al. | 524/506 |
| 5,648,023 A | * | 7/1997 | Nojima | 261/44.4 |
| 6,240,957 B1 | * | 6/2001 | Hattori | 137/515 |
| 6,297,339 B1 | * | 10/2001 | Osawa et al. | 523/205 |
| 6,398,059 B1 | * | 6/2002 | Hayashi et al. | 220/4.13 |

FOREIGN PATENT DOCUMENTS

| | | | |
|---|---|---|---|
| EP | 0361733 | 4/1990 | |
| EP | 0590595 | 4/1994 | |
| JP | 359040070 A | * 3/1984 | ................ 137/843 |
| JP | 2-062738 | 3/1990 | |
| JP | 10-267143 | 10/1998 | |
| JP | 11-063345 | 3/1999 | |
| JP | 2000-337538 | 12/2000 | |

OTHER PUBLICATIONS

European Search Report dated Jun. 21, 2002.

* cited by examiner

*Primary Examiner*—John Rivell
*Assistant Examiner*—Ramesh Krishnamurthy
(74) *Attorney, Agent, or Firm*—Armstrong, Westerman & Hattori, LLP

(57) ABSTRACT

A check valve which tends to be free from clamp damage and has a satisfactory pressure loss balance even if being used with a gasohol. The check valve comprises a fluoro-silicone rubber having:

(A) a tear strength of not smaller than 150 N/cm;
(B) an initial 100% tensile stress of not greater than 3.5 MPa;
(C) a 100% tensile stress of 1.8 to 3.0 MPa after immersion in a gasohol; and
(D) a volume swell of not greater than 35% after immersion in the gasohol.

3 Claims, 3 Drawing Sheets

CHECK VALVE

BACKGROUND OF THE INVENTION

1. Field of the Invention

The present invention relates to a check valve having a back-flow preventing function and, more particularly, to a check valve used for the transport of an automotive fuel such as a gasoline, particularly a gasohol (alcohol-blended gasoline).

2. Description of the Art

For prevention of back-flow of a fluid, fluid lines such as automotive fluid lines are generally provided with a check valve, which is fixed to a midportion thereof (or at an end thereof) by means of a clamp. A cut-off valve and a duckbill valve, for example, are known as check valves having a back-flow preventing function.

A check valve is typically composed of a rubber material. A particularly preferred material for the check valve in terms of gasoline resistance, low-temperature resistance and pressure loss balance is a fluorosilicone rubber.

In recent years, public attention has been directed to environmental issues. In the United States, the use of methyl t-butyl ether (MTBE), which has conventionally been blended as an octane value increasing agent in gasoline, has been banned to help prevent ground water pollution. For use as an alternative to gasoline containing methyl t-butyl ether, gasohol containing an alcohol additive is now under consideration.

Even if such a gasohol is transported through a fluid line, the fluorosilicone rubber is still employed as the material for the check valve, because no limitation is imposed on the rubber material for the check valve.

However, where a check valve composed of ordinary fluorosilicone rubber for transport of gasohol is fixed to an automotive fuel line by means of the clamp, the check valve is liable to be damaged or cut by the clamp because the fluorosilicone rubber has a high swelling degree with respect to gasohol.

In view of the foregoing, it is an object of the present invention to provide a check valve which is free from clamp damage and has a satisfactory pressure loss balance even if being used with the gasohol.

SUMMARY OF THE INVENTION

In accordance with the present invention to achieve the aforesaid object, there is provided a check valve comprising a fluorosilicone rubber having:

(A) a tear strength of not smaller than 150 N/cm;

(B) an initial 100% tensile stress of not greater than 3.5 MPa;

(C) a 100% tensile stress of 1.8 to 3.0 MPa after immersion in a gasohol; and (D) a volume swell of not greater than 35% after immersion in the gasohol.

The inventors of the present invention have conducted intensive studies to provide a check valve which is free from clamp damage even if being used with an automotive gasohol fuel. The inventors have found that, where a fluorosilicone rubber employed as a material for the check valve has a tear strength within a predetermined range, an initial 100% tensile stress within a predetermined range, a 100% tensile stress within a predetermined range after immersion in a gasohol and a volume swell within a predetermined range after immersion in the gasohol, the check valve has an excellent resistance to swelling by gasohol. As a result, the check valve tends to be free from clamp damage, so that the check valve can advantageously be used in an automotive fuel transport line in which the gasohol flows. Thus, the present invention has been attained.

DESCRIPTION OF THE PREFERRED EMBODIMENT

An embodiment of the present invention will hereinafter be described in detail.

Figure 1:
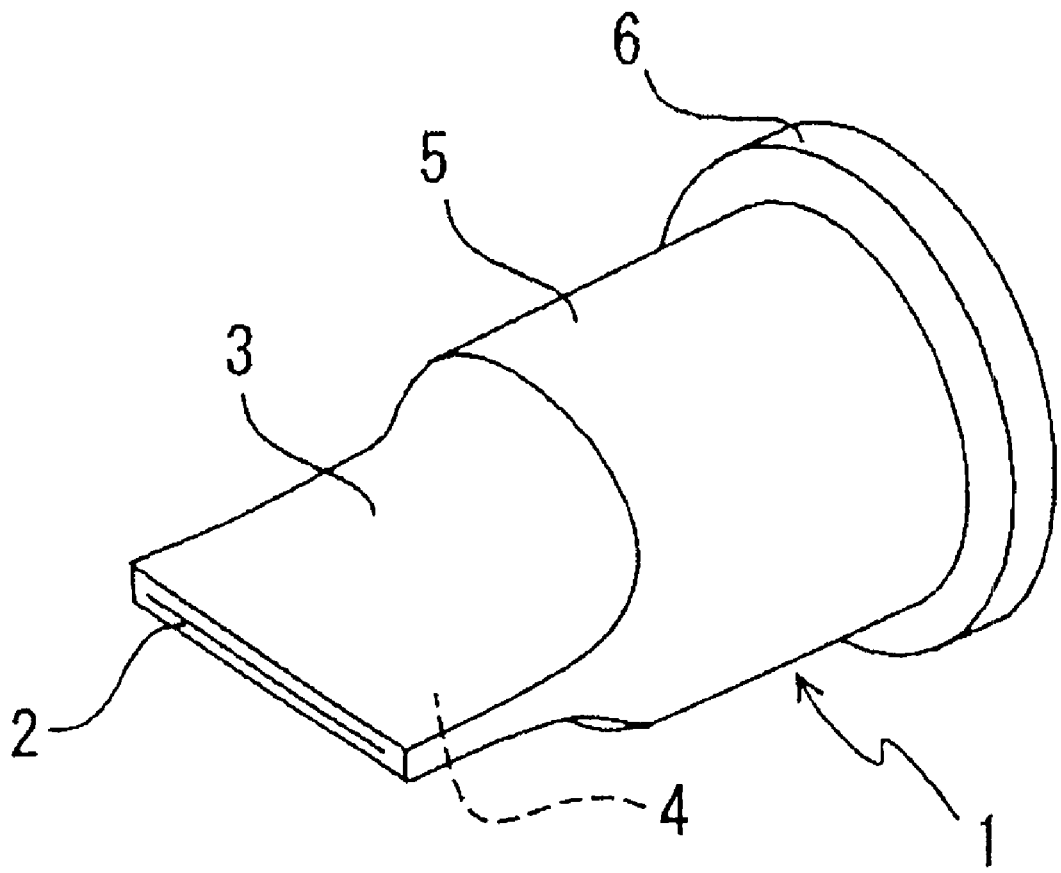
FIG. 1 is a perspective view illustrating a check valve according to one embodiment of the present invention.
Figure 2:
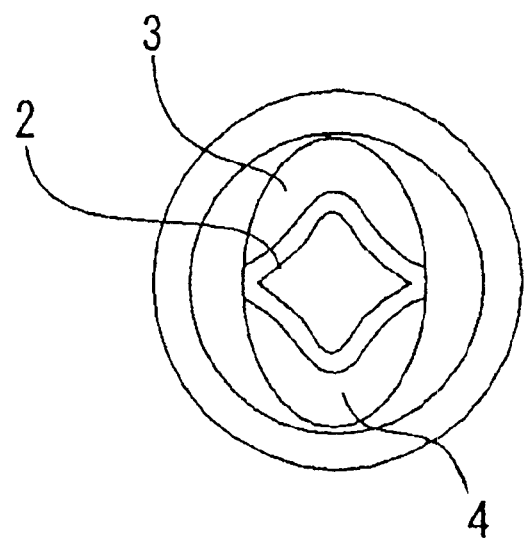
FIG. 2(a) is a plan view illustrating the check valve in an open state.
FIG. 2(b) is a plan view illustrating the check valve in a closed state.
Figure 2:
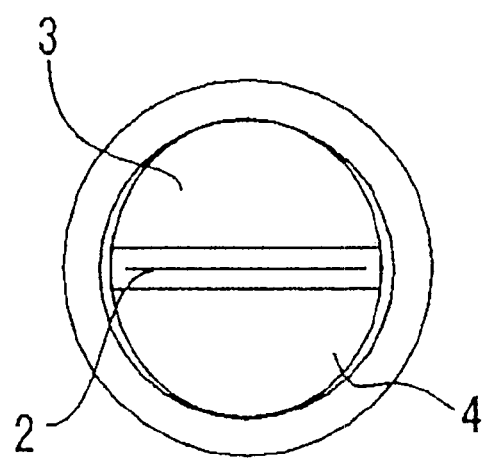

A check valve 1 according to the present invention is composed of a specific fluorosilicone rubber. The w check valve 1 has a construction as shown in FIG. 1. As shown, the check valve 1 includes an opening/closing slit portion 2, slant portions 3 and 4, a body 5, and a stopper 6. The body 5 has a hollow interior portion and an open inlet (not shown) provided radially inwardly of the stopper 6. The check valve 1 having the aforesaid construction is attached to an automotive fuel (gasohol) transport line. When the gasohol flows into the check valve 1 from the inlet, the opening/closing slit portion 2 is opened by the pressure of the gasohol as shown in FIG. 2(a) so as to allow the gasohol to flow in one direction through the check valve 1. When the gasohol flows in a direction opposite to an ordinary flow direction (the aforesaid direction), the opening/closing slit portion 2 is closed as shown in FIG. 2(b), because no force is exerted on the opening/closing slit portion 2 for opening the opening/closing slit portion 2 and the gasohol flowing in the opposite direction impacts against the slant portions 3 and 4. With this arrangement, the check valve 1 has the function of causing the gasohol to flow unidirectionally to prevent back-flow of the gasohol. Though not shown, the check valve 1 is attached to the transport line with the body 5 thereof being clamped by a clamp.

The check valve 1 is composed of a fluorosilicone rubber having:

(A) a tear strength of not smaller than 150 N/cm;

(B) an initial 100% tensile stress of not greater than 3.5 MPa;

(C) a 100% tensile stress of 1.8 to 3.0 MPa after immersion in the gasohol; and (D) a volume swell of not greater than 35% after immersion in the gasohol.

The tear strength of the fluorosilicone rubber should be not smaller than 150 N/cm, preferably not smaller than 160 N/cm (property (A)). If the tear strength of the fluorosilicone rubber is smaller than 150 N/cm, the check valve 1 is liable to be torn when being unmolded. As a result, the production yield is reduced.

The initial 100% tensile stress of the fluorosilicone rubber should be not greater than 3.5 MPa, preferably 2.0 to 3.5 MPa (property (B)). If the initial 100% tensile stress of the fluorosilicone rubber is greater than 3.5 MPa, the opening/closing slit portion 2 at the distal end of the check valve 1 tends to have a poor response, resulting in deterioration of the back-flow preventing function.

L The properties (C) and (D) will be described in greater detail. The 100% tensile stress and the volume swell of the fluorosilicone rubber are determined after the fluorosilicone rubber is immersed in 85 vol % of Fuel B (30 vol % of toluene and 70 vol % of isooctane) containing 15 vol % of methanol at 60° C. for 72 hours. The 100% tensile stress of the fluorosilicone rubber thus determined should be 1.8 to 3.0 MPa, preferably 2.0 to 2.5 MPa. The volume swell of the fluorosilicone rubber thus determined should be not greater than 35%, preferably 20 to 34%. The check valve composed of the fluorosilicone rubber having the aforesaid properties has an excellent resistance to clamp damage, ensuring the effects of the present invention.

A suitable material for the fluorosilicone rubber having the aforesaid properties (A) to (D) comprises a copolymer represented by the following general formula (1) as a main component thereof:

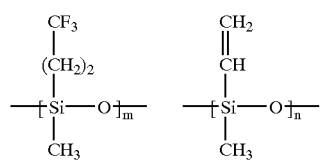

(1)

(wherein m is a positive number of 500 to 19,800 and n is a positive number of 1 to 200), and having a vinyl-to-Si ratio (a ratio of the number of vinyl groups to the number of silicon atoms) of 0.002 to 0.01.

The term "main component" herein means an essential component of the rubber which significantly influences the properties of the rubber, and means that the fluorosilicone rubber may comprise the copolymer alone.

The copolymer preferably has a polymerization degree of 500 to 20,000, more preferably 2,000 to 12,000. If the polymerization degree is excessively small, the resulting check valve tends to have a lower mechanical strength. If the polymerization degree is excessively great, the resulting fluorosilicone rubber tends to have a poorer workability. Copolymers of the general formula (1) having different polymerization degrees and different vinyl-to-Si ratios within the range from 0.002 to 0.01 may be blended to provide the fluorosilicone rubber.

The fluorosilicone rubber material may further comprise a strengthening agent such as silica. Different types of silica, each having an average particle diameter of about 7 nm to about 30 nm and a specific surface area of about 130 $m^2/g$ to about 400 $m^2/g$ and prepared by a dry method or a wet method, are preferably used either alone or in combination as the strengthening agent.

The fluorosilicone rubber material may further comprise a coupling agent, a silicone resin, an alkoxysilane, a hydroxysilane, a low-viscosity silicone oil having a terminal hydroxyl group or ether group, or a silylation agent to optimize the resultant material in terms of workability, volume swell and strength. Preferred examples of the coupling agent include coupling agents having an alkoxy group, a halogen or an acetoxy group as a hydrolyzable group, and coupling agents having an amino group, a methacryl group, a vinyl group, an epoxy group or a mercapto group as an organic functional group. Among these coupling agents, a coupling agent having a vinyl group or an epoxy group as the organic functional group is more preferred.

The fluorosilicone rubber material may further comprise a heat-resistance improving agent such as iron oxide, cerium oxide, iron octylate or titanium oxide in an amount which does not hinder the fulfillment of the object of the present invention.

The check valve 1 can be produced from the aforesaid fluorosilicone rubber material, for example, in the following manner.

First, a liquid rubber composition for preparation of the fluorosilicone rubber material is kneaded by means of a kneader or the like. Then, the rubber composition is filled into a cavity of a check valve mold, and the mold is entirely heated at 170° C. for 10 minutes for cross-linking the rubber composition. In turn, the resulting cured rubber body is unmolded, and further heated in an air oven at 200° C. for 4 hours for post cure. Thus, the intended check valve 1 is obtained.

Alternatively, the inventive check valve may be produced by a compression molding method.

In accordance with the present invention, the construction of the check valve is not limited to that shown in FIG. 1, as long as the gasohol can assuredly be caused to flow unidirectionally without back-flow thereof.

Next, an explanation will be given to Examples and Comparative Examples. In the following explanation, the amounts of ingredients are given as parts by weight unless otherwise specified.

EXAMPLE 1

First, a check valve mold was prepared. Then, 15 parts of AEROJIL 300 (silicon dioxide available from Japan Aerojil Co., Ltd.), 20 parts of NIPSEAL VN3 (synthetic silica available from Nippon Silica Industry Co., Ltd.), 2 parts of diphenylsilanediol, 0.8 parts of vinyltrimethoxysilane, 0.5 parts of red oxide, 0.8 parts of 2,5-bis(t-butylperoxy)-2,5-dimethylhexane were blended with 100 parts of a fluorosilicone rubber (having a vinyl-to-Si ratio of 0.003 and an average polymerization degree of 10,000) for preparation of a rubber composition. After the rubber composition was injected into the mold, the mold was entirely heated at 170° C. for 10 minutes for cross-linking the rubber composition. In turn, the resulting cured rubber body was unmolded, and further heated in an air oven at 200° C. for 4 hours for post cure. Thus, the intended check valve was obtained (see FIG. 1).

EXAMPLE 2

A check valve was produced in substantially the same manner as in Example 1, except that AEROJIL 300 was blended in an amount of 25 parts.

EXAMPLE 3

A check valve was produced in substantially the same manner as in Example 1, except that 0.5 part of γ-glycidoxypropylmethyldiethoxysilane was employed instead of vinyltrimethoxysilane, and 2,5-bis(t-butylperoxy)-2,5-dimethylhexane was blended in an amount of 0.5 parts.

EXAMPLE 4

A check valve was produced in substantially the same manner as in Example 1, except that NIPSEAL VN3 was blended in an amount of 25 parts, and 3 parts of 91 dimethylpolysiloxane containing 3 mol % of vinylmethylsiloxane was added to the rubber composition.

COMPARATIVE EXAMPLE 1

A check valve was produced in substantially the same manner as in Example 1, except that SE1561U (fluorosilicone rubber compound available from Toray Dow Corning Co., Ltd.) only was employed as the rubber composition.

COMPARATIVE EXAMPLE 2

A check valve was produced in substantially the same manner as in Example 1, except that FE251K (fluorosilicone rubber compound available from Shin-Etsu Chemical Co., Ltd.) only was employed as the rubber composition.

COMPARATIVE EXAMPLE 3

A check valve was produced in substantially the same manner as in Example 1, except that 60 parts of AEROJIL 200 (silicon dioxide available from Japan Aerojil Co., Ltd.), 2 parts of diphenylsilanediol and 0.5 parts of 2,5-bis(t-butylperoxy)-2,5-dimethylhexane were blended with 100 parts of a fluorosilicone rubber (having a vinyl-to-Si ratio of 0.002 and an average polymerization degree of 10,000) for the preparation of the rubber composition.

COMPARATIVE EXAMPLE 4

A check valve was produced in substantially the same manner as in Example 1, except that 0.5 parts of vinyltrimethoxysilane was blended with 100 parts of SE1561U for the preparation of the rubber composition.

Evaluation tests for the following properties were performed on each of the check valves of Examples 1 to 4 and Comparative Examples 1 to 4 thus produced, and the results are shown in Tables 1 and 2.

Tear Strength

Figure 3:
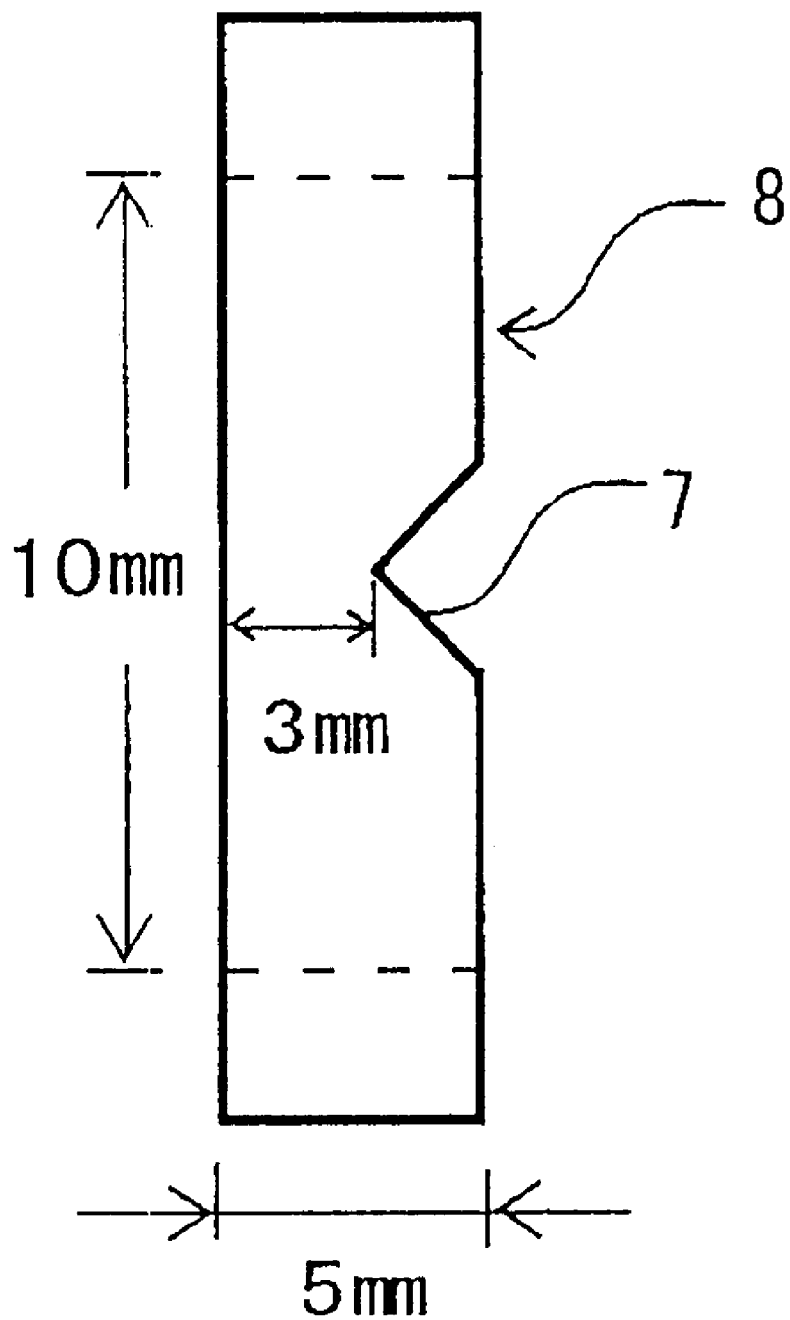
FIG. 3 is a plan view illustrating a sample cut out of a check valve for determination of the tear strength of the check valve.

A 5-mm wide strip was cut out circumferentially from the body of the check valve. Then, a portion of the strip was cut away at an angle of 90 degrees for preparation of a sample 8 as shown in FIG. 3 having a cut-away portion 7 (having a depth of 2 mm). The sample 8 was stretched at a rate of 100 mm/minute with an initial cross head distance of 10 mm by means of a tensile tester (STROGRAPH V-10B available from Toyo Seiki Co., Ltd.) for determination of tear strength.

Mold Releasability

Nine check valves for each of the aforesaid Examples and Comparative Examples were molded in the aforesaid manner by employing a nine-cavity mold. Then, the check valves were unmolded for determination of mold releasability. In tables 1 and 2, a symbol ○ indicates that all the nine check valves were smoothly unmolded without any damage, and a symbol X indicates that five or more check valves were damaged when being unmolded.

100% Tensile Stress

A 5-mm wide strip was cut out circumferentially from the body of the check valve for preparation of a sample. The sample was stretched at a rate of 100 mm/minute with an initial cross head distance of 10 mm by means of the tensile tester, and a stress occurring in the sample was measured when the cross head distance reached 20 mm.

Volume Swell with Gasohol

A sheet having a size of 25 mm×20 mm×1 mm (thickness) was molded from the check valve material in substantially the same molding method as described above. Then, the sheet was immersed in 85 vol % of Fuel B (30 vol % of toluene and 70 vol % of isooctane) containing 15 vol % of methanol at 60° C. for 72 hours. The volume swell of the sheet was calculated on the basis of volume of the sheet measured before and after the immersion of the sheet.

Back-flow Preventing Function

The check valve was attached to a pipe, and gasohol was caused to flow back at a pressure of 1.0 MPa. In Tables 1 and 2, a symbol ○ indicates that the back-flow amount of gasohol was smaller than 1 cc, a symbol Δ indicates that the back-flow amount of gasohol was smaller than 3 cc and not smaller than 1 cc, and a symbol X indicates that the back-flow amount of gasohol was not smaller than 3 cc.

Clamp Damage

Five check valves were prepared for each of the aforesaid Examples and Comparative Examples, and each valve was fixed to a pipe having an outer diameter of 8 mm with the body thereof being clamped by means of a spring clamp. Then, the check valve and the pipe were immersed in 85 vol % of Fuel B (30 vol % of toluene and 70 vol % of isooctane) containing 15 vol % of methanol at 60° C. for 72 hours. After the spring clamp was removed, the check valves were examined for cracking. In Tables 1 and 2, clamp damage was expressed by the ratio of the number of the damaged check valves to the number of the tested check valves (five).

TABLE 1

| | Example | | | |
|---|---|---|---|---|
| | 1 | 2 | 3 | 4 |
| Tear strength (N/cm) | 160 | 240 | 270 | 150 |
| 100% tensile stress (MPa) | 2.7 | 3.2 | 2.4 | 3.4 |
| Mold releasability | ○ | ○ | ○ | ○ |
| Back-flow preventing function | ○ | ○ | ○ | ○ |
| 100% tensile stress (MPa) after gasohol immersion | 2.1 | 2.2 | 1.8 | 3.0 |
| Volume swell (%) with gasohol | 30.3 | 31.1 | 34.0 | 19.7 |
| Clamp damage (Number of damaged check valves/Number of tested check valves) | 0/5 | 0/5 | 0/5 | 0/5 |

TABLE 2

| | Comparative Example | | | |
|---|---|---|---|---|
| | 1 | 2 | 3 | 4 |
| Tear strength (N/cm) | 210 | 187 | 136 | 200 |
| 100% tensile stress (MPa) | 2.5 | 1.8 | 3.5 | 1.4 |
| Mold releasability | ○ | ○ | X | ○ |
| Back-flow preventing function | ○ | ○ | Δ | ○ |
| 100% tensile stress (MPa) after gasohol immersion | 1.7 | 0.9 | 2.5 | 1.2 |
| Volume swell (%) with gasohol | 35.8 | 47.2 | 35.1 | 33.7 |
| Clamp damage (Number of damaged check valves/Number of tested check valves) | 3/5 | 4/5 | 2/5 | 5/5 |

As can be understood from the results shown in Tables 1 and 2, the check valves of Examples 1 to 4 were excellent in mold releasability and back-flow preventing function and highly resistant to clamp damage after immersion in gasohol.

By contrast, the check valves of Comparative Examples 1 to 4 suffered from cracking due to clamp damage. The check valve of Comparative Example 3 was poor in mold releasability and back-flow preventing function, though the number of the check valves cracked due to clamp damage was relatively small.

As described above, the check valve according to the present invention comprises a fluorosilicone rubber having the specific properties. With the properties of the fluorosilicone rubber, the check valve has a satisfactory pressure loss balance and an excellent back-flow preventing function. In addition, the check valve is free from tearing when being unmolded in the production process, so that reductions in yield can effectively be prevented. With the properties of the fluorosilicone rubber, the check valve has an excellent resistance to clamp damage, even if the check valve is immersed in gasohol. Therefore, the check valve can advantageously be used without any problem in a joint of a fuel transport line of an automobile employing gasohol fuel. Further, the check valve tends to be free from clamp damage even if the check valve is clamped with a relatively great clamping force. Therefore, the check valve can effectively be secured to the fuel line by application of a greater clamping force.

What is claimed is:

1. A check valve comprising a fluorosilicone rubber having:

(A) a tear strength of not smaller than 150 N/cm;

(B) an initial 100% tensile stress of not greater than 3.5 MPa;

(C) a 100% tensile stress of 1.8 to 3.0 MPa after immersion in a gasohol; and (D) a volume swell of not greater than 35% after immersion in the gasohol.

2. A check valve as set forth in claim 1, wherein the fluorosilicone rubber comprises a cross-linked copolymer represented by the general formula (1):

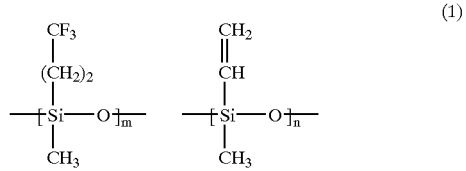

wherein m is a positive number of 500 to 19,800 and n is a positive number of 1 to 200, and having a vinyl-to-Si ratio of 0.002 to 0.01.

3. A check valve as set forth in claim 2, wherein the copolymer has an average polymerization degree of 500 to 20,000.

* * * * *